(12) United States Patent
Woods et al.

(10) Patent No.: US 11,656,663 B2
(45) Date of Patent: *May 23, 2023

(54) THERMAL MANAGEMENT SYSTEMS FOR WEARABLE COMPONENTS

(71) Applicant: Magic Leap, Inc., Plantation, FL (US)

(72) Inventors: Michael Janusz Woods, Mountain View, CA (US); Paul M. Greco, Parkland, FL (US)

(73) Assignee: MAGIC LEAP, INC., Plantation, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/112,232

(22) Filed: Dec. 4, 2020

(65) Prior Publication Data
US 2021/0089095 A1 Mar. 25, 2021

Related U.S. Application Data

(63) Continuation of application No. 15/814,099, filed on Nov. 15, 2017, now Pat. No. 10,860,070.

(60) Provisional application No. 62/423,192, filed on Nov. 16, 2016.

(51) Int. Cl.
| | |
|---|---|
| *G06F 1/20* | (2006.01) |
| *G02B 27/01* | (2006.01) |
| *B32B 27/12* | (2006.01) |
| *G06F 1/16* | (2006.01) |

(52) U.S. Cl.
CPC ............ *G06F 1/203* (2013.01); *B32B 27/12* (2013.01); *G02B 27/0149* (2013.01); *G06F 1/163* (2013.01); *B32B 2307/302* (2013.01)

(58) Field of Classification Search
CPC ...................................................... G06F 1/163
See application file for complete search history.

(56) References Cited

U.S. PATENT DOCUMENTS

| | | | |
|---|---|---|---|
| 6,850,221 | B1 | 2/2005 | Tickle |
| 8,950,867 | B2 | 2/2015 | Macnamara |
| 9,081,426 | B2 | 7/2015 | Armstrong |
| 9,215,293 | B2 | 12/2015 | Miller |

(Continued)

FOREIGN PATENT DOCUMENTS

| | | |
|---|---|---|
| CN | 104914582 A | 9/2015 |
| CN | 105446443 A | 3/2016 |

(Continued)

OTHER PUBLICATIONS

International Search Report and Written Opinion for PCT Application No. PCT/US2017/061823, dated Jan. 25, 2018.

(Continued)

*Primary Examiner* — Mukundbhai G Patel
(74) *Attorney, Agent, or Firm* — Seed IP Law Group LLP

(57) ABSTRACT

In various embodiments, a wearable component configured to be worn on a head of a user is disclosed. The wearable component can comprise a wearable support and an electronic component coupled to or disposed within the wearable support. A thermal management structure can be provided in thermal communication with the electronic component. The thermal management structure can be configured to transfer heat from the electronic component away from the head of the user when the wearable support is disposed on the head of the user.

23 Claims, 12 Drawing Sheets

(56) References Cited

U.S. PATENT DOCUMENTS

| | | | |
|---|---|---|---|
| 9,310,559 | B2 | 4/2016 | Macnamara |
| 9,348,143 | B2 | 5/2016 | Gao et al. |
| D758,367 | S | 6/2016 | Natsume |
| 9,417,452 | B2 | 8/2016 | Schowengerdt et al. |
| 9,470,906 | B2 | 10/2016 | Kaji et al. |
| 9,547,174 | B2 | 1/2017 | Gao et al. |
| 9,671,566 | B2 | 6/2017 | Abovitz et al. |
| 9,740,006 | B2 | 8/2017 | Gao |
| 9,791,700 | B2 | 10/2017 | Schowengerdt et al. |
| 9,851,563 | B2 | 12/2017 | Gao et al. |
| 9,857,591 | B2 | 1/2018 | Welch et al. |
| 9,874,749 | B2 | 1/2018 | Bradski |
| 10,048,722 | B2 | 8/2018 | Huang et al. |
| 10,860,070 | B2 | 12/2020 | Woods et al. |
| 2006/0028436 | A1 | 2/2006 | Armstrong |
| 2007/0081123 | A1 | 4/2007 | Lewis |
| 2009/0008770 | A1 | 1/2009 | Hasegawa |
| 2012/0127062 | A1 | 5/2012 | Bar-Zeev et al. |
| 2012/0162549 | A1 | 6/2012 | Gao et al. |
| 2012/0206882 | A1* | 8/2012 | Mohammed ........ H01L 23/3735 977/932 |
| 2012/0234524 | A1 | 9/2012 | Fan et al. |
| 2013/0082922 | A1 | 4/2013 | Miller |
| 2013/0117377 | A1 | 5/2013 | Miller |
| 2013/0125027 | A1 | 5/2013 | Abovitz |
| 2013/0208234 | A1 | 8/2013 | Lewis |
| 2013/0242262 | A1 | 9/2013 | Lewis |
| 2014/0071539 | A1 | 3/2014 | Gao |
| 2014/0177023 | A1 | 6/2014 | Gao et al. |
| 2014/0218468 | A1 | 8/2014 | Gao et al. |
| 2014/0267420 | A1 | 9/2014 | Schowengerdt |
| 2014/0306866 | A1 | 10/2014 | Miller et al. |
| 2015/0016777 | A1 | 1/2015 | Abovitz et al. |
| 2015/0029661 | A1* | 1/2015 | Huang ................ H01L 35/30 361/679.54 |
| 2015/0103306 | A1 | 4/2015 | Kaji et al. |
| 2015/0178939 | A1 | 6/2015 | Bradski et al. |
| 2015/0205126 | A1 | 7/2015 | Schowengerdt |
| 2015/0222883 | A1 | 8/2015 | Welch |
| 2015/0222884 | A1 | 8/2015 | Cheng |
| 2015/0268415 | A1 | 9/2015 | Schowengerdt et al. |
| 2015/0301599 | A1 | 10/2015 | Miller |
| 2015/0302652 | A1 | 10/2015 | Miller et al. |
| 2015/0309263 | A2 | 10/2015 | Abovitz et al. |
| 2015/0309995 | A1 | 10/2015 | Osterhout |
| 2015/0326570 | A1 | 11/2015 | Publicover et al. |
| 2015/0346490 | A1 | 12/2015 | TeKolste et al. |
| 2015/0346495 | A1 | 12/2015 | Welch et al. |
| 2015/0359135 | A1 | 12/2015 | Cavallaro et al. |
| 2016/0011419 | A1 | 1/2016 | Gao |
| 2016/0026253 | A1 | 1/2016 | Bradski et al. |
| 2016/0041395 | A1 | 2/2016 | Yajima |
| 2016/0085278 | A1 | 3/2016 | Osterhout et al. |
| 2016/0209659 | A1 | 7/2016 | Nikkhoo et al. |
| 2016/0212879 | A1 | 7/2016 | Nikkhoo et al. |
| 2016/0212887 | A1* | 7/2016 | Nikkhoo ............ H05K 7/20418 |
| 2016/0343466 | A1 | 11/2016 | Wu |
| 2016/0381832 | A1 | 12/2016 | Hurbi et al. |
| 2017/0053165 | A1 | 2/2017 | Kaehler |
| 2017/0097509 | A1 | 4/2017 | Yoshida |
| 2017/0161919 | A1 | 6/2017 | Schroeder et al. |
| 2017/0337470 | A1 | 11/2017 | DeTone et al. |
| 2018/0036703 | A1 | 5/2018 | Woods et al. |
| 2018/0348826 | A1 | 12/2018 | Aguirre |
| 2020/0033921 | A1 | 1/2020 | Rohena et al. |
| 2020/0383240 | A1 | 12/2020 | Rohena |

FOREIGN PATENT DOCUMENTS

| | | |
|---|---|---|
| CN | 205082109 U | 3/2016 |
| CN | 105491860 A | 4/2016 |
| CN | 105829953 A | 8/2016 |
| CN | 205545518 U | 8/2016 |
| JP | 2001-306187 A | 11/2001 |
| JP | 2006-130753 | 5/2006 |
| JP | 2006-130753 A | 5/2006 |
| JP | 2013-054076 A | 3/2013 |
| JP | 2013-0540076 | 3/2013 |
| JP | 2014-515876 | 7/2014 |
| JP | 2014-515876 A | 7/2014 |
| JP | 2016-039520 A | 3/2016 |
| JP | 2016-096513 | 5/2016 |
| JP | 2016-096513 A | 5/2016 |
| WO | WO 2015/083316 | 6/2015 |
| WO | WO 2015/142669 | 9/2015 |
| WO | WO 2018/093917 | 6/2019 |

OTHER PUBLICATIONS

International Preliminary Report for Patentability for PCT Application No. PCT/US2017/061823, dated May 21, 2019.

ARToolKit: https://web.archive.org/web/20051013062315/http://www.hitl.washington.edu:80/artoolkit/documentation/hardware.htm, archived Oct. 13, 2005.

Azuma, "A Survey of Augmented Reality," Teleoperators and Virtual Environments 6, 4 (Aug. 1997), pp. 355-385. https://web.archive.org/web/20010604100006/http://www.cs.unc.edu/~azuma/ARpresence.pdf.

Azuma, "Predictive Tracking for Augmented Realty." TR95-007, Department of Computer Science, UNC—Chapel Hill, NC, Feb. 1995.

Bimber, et al., "Spatial Augmented Reality—Merging Real and Virtual Worlds," 2005 https://web.media.mit.edu/~raskar/book/BimberRaskarAugmentedReaiityBook.pdf.

Jacob, "Eye Tracking in Advanced Interface Design," Human-Computer Interaction Lab Naval Research Laboratory, Washington, D.C. / paper/ in Virtual Environments and Advanced Interface Design, ed. by W. Barfield and T.A. Furness, pp. 258-288, Oxford University Press, New York (1995).

Tanriverdi and Jacob, "Interacting With Eye Movements in Virtual Environments," Department of Electrical Engineering and Computer Science, Tufts University, Medford, MA—paper/Proc. ACM CHI 2000 Human Factors in Computing Systems Conference, pp. 265-272, Addison-Wesley/ACM Press (2000).

\* cited by examiner

THERMAL MANAGEMENT SYSTEMS FOR WEARABLE COMPONENTS

CROSS-REFERENCE TO RELATED APPLICATIONS

This application is a continuation application of U.S. application Ser. No. 15/814,099, filed Nov. 15, 2017, which claims priority to U.S. Provisional Patent Application No. 62/423,192, filed Nov. 16, 2016, the contents of which are incorporated by reference herein in their entirety and for all purposes.

BACKGROUND

Field of the Invention

The field relates to thermal management systems for wearable components, including thermal management systems for head-mounted augmented reality systems.

Description of the Related Art

Modern computing and display technologies have facilitated the development of virtual reality ("VR"), augmented reality ("AR"), and mixed reality ("MR") systems. A VR system creates a simulated environment for a user to experience. This can be done by presenting computer-generated imagery to the user through a head-mounted display. This imagery creates a sensory experience which immerses the user in the simulated environment. A VR scenario typically involves presentation of only computer-generated imagery rather than also including actual real-world imagery.

An AR system generally supplements a real-world environment with simulated elements. For example, an AR system may provide a user with a view of the surrounding real-world environment via a head-mounted display. However, computer-generated imagery can also be presented on the display to enhance the real-world environment. This computer-generated imagery can include elements which are contextually-related to the real-world environment. Such elements can include simulated text, images, objects, etc. An MR system is a type of AR system which also introduces simulated objects into a real-world environment, but these objects typically feature a greater degree of interactivity. The simulated elements can often times be interactive in real time

SUMMARY

In one embodiment, a wearable component configured to be worn on a head of a user is disclosed. The wearable component can comprise a wearable support and an electronic component in thermal communication with the wearable support. A thermal management structure can be in thermal communication with the electronic component, the thermal management structure configured to transfer heat from the electronic component away from a user side of the wearable component.

In another embodiment, a wearable component configured to be worn on a head of a user is disclosed. The wearable component can comprise an internal mechanical structure and an outer shell structure mechanically coupled with the internal mechanical structure such that the internal mechanical structure is between a user side of the wearable component and the outer shell structure. The internal mechanical structure can be configured to transfer heat away from the user side of the wearable component to the outer shell structure. A thermally conductive via can extend from the internal mechanical structure at least partially through a thickness of the outer shell structure.

In another embodiment, a method of manufacturing a wearable component configured to be worn on a head of a user is disclosed. The method can comprise providing an internal mechanical structure and a thermally conductive via extending from the internal mechanical structure at least partially through a thickness of the outer shell structure. The method can comprise mechanically coupling a back surface of an outer shell structure to the internal mechanical structure such that the internal mechanical structure is between a user side of the wearable component and the outer shell structure. The internal mechanical structure can be configured to transfer heat away from the user side of the wearable component to the outer shell structure.

Details of one or more embodiments of the subject matter described in this specification are set forth in the accompanying drawings and in the description below. Other features, aspects, and advantages will become apparent from the description, the drawings, and the claims.

Throughout the drawings, reference numbers may be re-used to indicate correspondence between referenced elements. The drawings are provided to illustrate example embodiments described herein and are not intended to limit the scope of the disclosure.

DETAILED DESCRIPTION

Overview of AR, VR and Localization Systems

Figure 1:
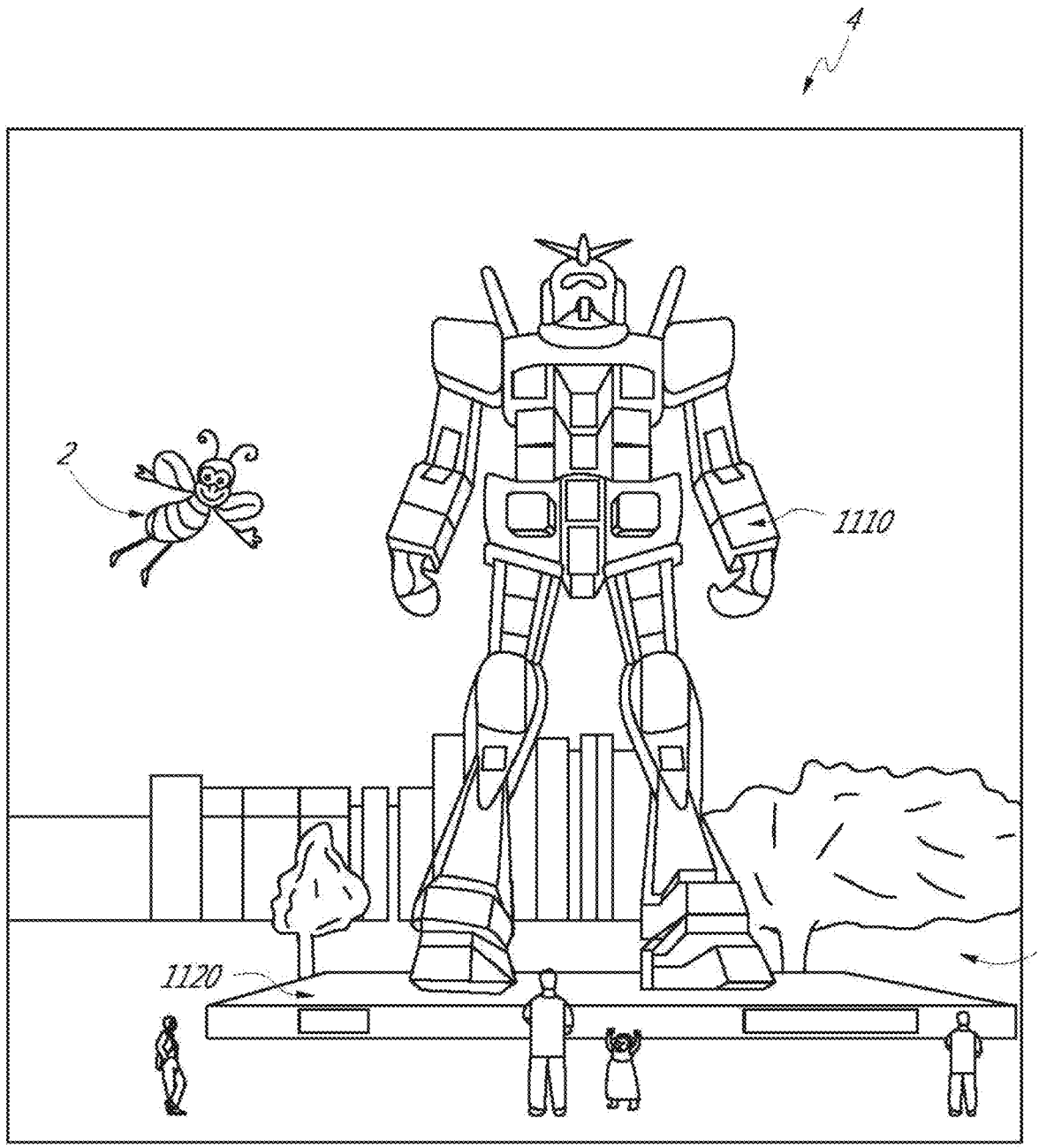
FIG. 1 depicts an illustration of an augmented reality scenario with certain virtual reality objects, and certain physical objects viewed by a person.

In FIG. 1, an augmented reality scene (4) is depicted where a user of an AR technology sees a real-world park-like setting (6) featuring people, trees, buildings in the background, and a concrete platform (1120). In addition to these items, the user of the AR technology also perceives that he "sees" a robot statue (1110) standing upon the real-world platform (1120), and a cartoon-like avatar character (2) flying by which seems to be a personification of a bumble bee, even though these elements (2, 1110) do not exist in the real world. The human visual perception system is very complex, and producing a VR or AR technology that facilitates a comfortable, natural-feeling, rich presentation of virtual image elements amongst other virtual or real-world imagery elements is challenging.

Head-worn VR or AR displays (or helmet-mounted displays, or smart glasses) typically are at least loosely coupled to a user's head, and thus move when the user's head moves. If the user's head motions are detected by the display system, the data being displayed can be updated to take the change in head pose into account. As an example, if a user wearing a head-worn display views a virtual representation of a three-dimensional (3D) object on the display and walks around the area where the 3D object appears, that 3D object can be re-rendered for each viewpoint, giving the user the perception that he or she is walking around an object that occupies real space. If the head-worn display is used to present multiple objects within a virtual space (for instance, a rich virtual world), measurements of head pose (e.g., the location and orientation of the user's head) can be used to re-render the scene to match the user's dynamically changing head location and orientation and provide an increased sense of immersion in the virtual space.

In AR systems, detection or calculation of head pose can permit the display system to render virtual objects such that they appear to occupy a space in the real world in a manner that makes sense to the user. In addition, detection of the position and/or orientation of a real object, such as handheld device (which also may be referred to as a "totem"), haptic device, or other real physical object, in relation to the user's head or AR system may also facilitate the display system in presenting display information to the user to enable the user to interact with certain aspects of the AR system efficiently. As the user's head moves around in the real world, the virtual objects may be re-rendered as a function of head pose, such that the virtual objects appear to remain stable relative to the real world. At least for AR applications, placement of virtual objects in spatial relation to physical objects (e.g., presented to appear spatially proximate a physical object in two- or three-dimensions) may be a non-trivial problem. For example, head movement may significantly complicate placement of virtual objects in a view of an ambient environment. Such is true whether the view is captured as an image of the ambient environment and then projected or displayed to the end user, or whether the end user perceives the view of the ambient environment directly. For instance, head movement will likely cause a field of view of the end user to change, which will likely require an update to where various virtual objects are displayed in the field of the view of the end user. Additionally, head movements may occur within a large variety of ranges and speeds. Head movement speed may vary not only between different head movements, but within or across the range of a single head movement. For instance, head movement speed may initially increase (e.g., linearly or not) from a starting point, and may decrease as an ending point is reached, obtaining a maximum speed somewhere between the starting and ending points of the head movement. Rapid head movements may even exceed the ability of the particular display or projection technology to render images that appear uniform and/or as smooth motion to the end user.

Head tracking accuracy and latency (e.g., the elapsed time between when the user moves his or her head and the time when the image gets updated and displayed to the user) have been challenges for VR and AR systems. Especially for display systems that fill a substantial portion of the user's visual field with virtual elements, it is advantageous if the accuracy of head-tracking is high and that the overall system latency is very low from the first detection of head motion to the updating of the light that is delivered by the display to the user's eyes. If the latency is high, the system can create a mismatch between the user's vestibular and visual sensory systems, and generate a user perception scenario that can lead to motion sickness or simulator sickness. If the system latency is high, the apparent location of virtual objects will appear unstable during rapid head motions.

In addition to head-worn display systems, other display systems can benefit from accurate and low latency head pose detection. These include head-tracked display systems in which the display is not worn on the user's body, but is, e.g., mounted on a wall or other surface. The head-tracked display acts like a window onto a scene, and as a user moves his head relative to the "window" the scene is re-rendered to match the user's changing viewpoint. Other systems include a head-worn projection system, in which a head-worn display projects light onto the real world.

Additionally, in order to provide a realistic augmented reality experience, AR systems may be designed to be interactive with the user. For example, multiple users may play a ball game with a virtual ball and/or other virtual objects. One user may "catch" the virtual ball, and throw the ball back to another user. In another embodiment, a first user may be provided with a totem (e.g., a bat-like object communicatively coupled to the AR system) to hit the virtual ball. In other embodiments, a virtual user interface may be presented to the AR user to allow the user to select one of many options. The user may use totems, haptic devices, wearable components, or simply touch the virtual screen to interact with the system.

Detecting head pose and orientation of the user, and detecting a physical location of real objects in space enable the AR system to display virtual content in an effective and enjoyable manner. However, although these capabilities are advantageous to an AR system, they may be difficult to achieve. In other words, the AR system can recognize a physical location of a real object (e.g., user's head, totem, haptic device, wearable component, user's hand, etc.) and correlate the physical coordinates of the real object to virtual coordinates corresponding to one or more virtual objects being displayed to the user. This generally requires highly accurate sensors and sensor recognition systems that track a position and orientation of one or more objects at rapid rates. Current approaches may not perform localization at satisfactory speed or precision standards. Thus, there is a need for a better localization system in the context of AR and VR devices.

Example AR and VR Systems and Components

With reference to FIGS. 2A-2D, some general componentry options are illustrated. In the portions of the detailed description which follow the discussion of FIGS. 2A-2D, various systems, subsystems, and components are presented for addressing the objectives of providing a high-quality, comfortably-perceived display system for human VR and/or AR.

Figure 2A:
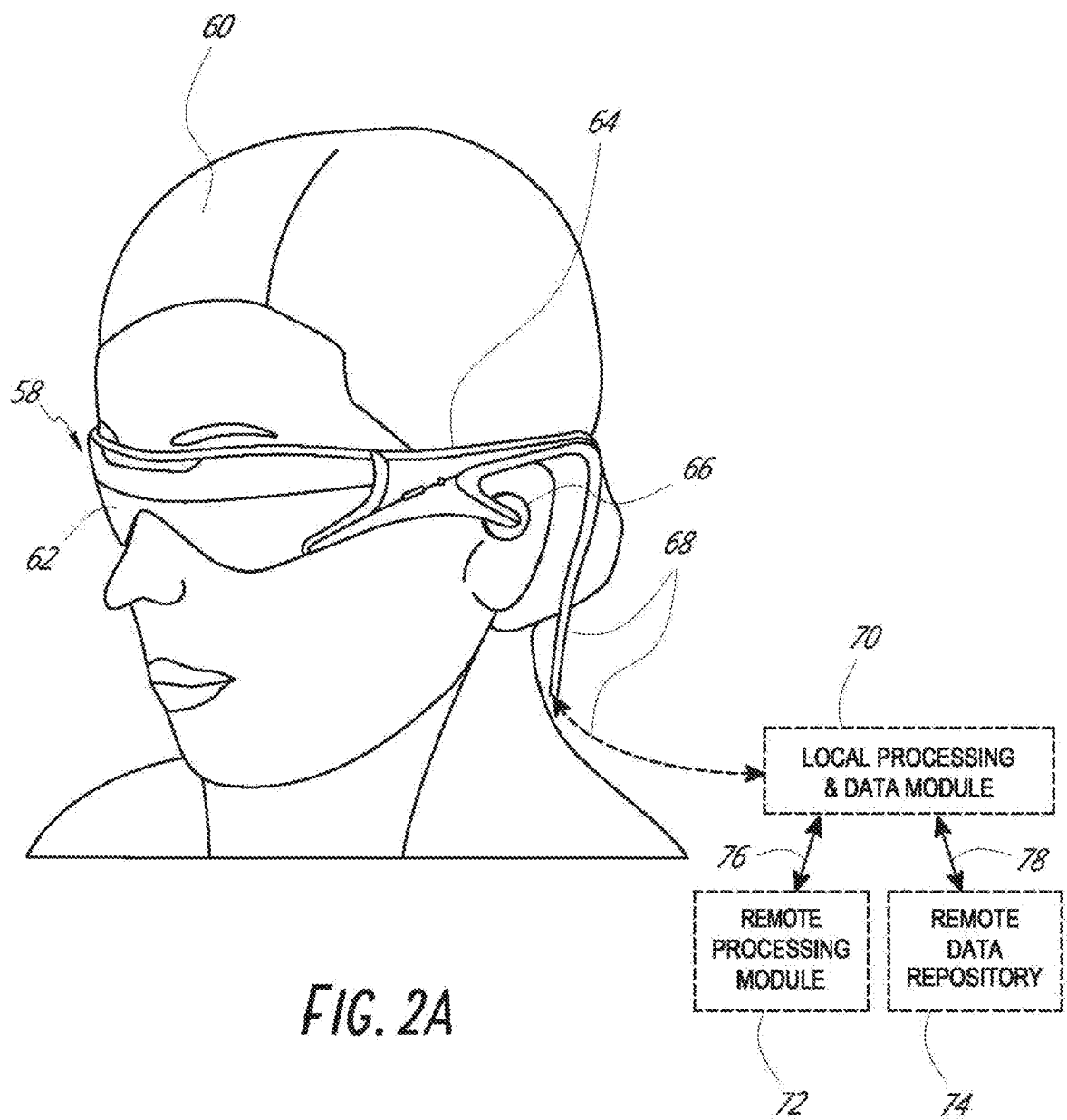
FIGS. 2A-2D schematically illustrate examples of a wearable system.
Figure 2B:
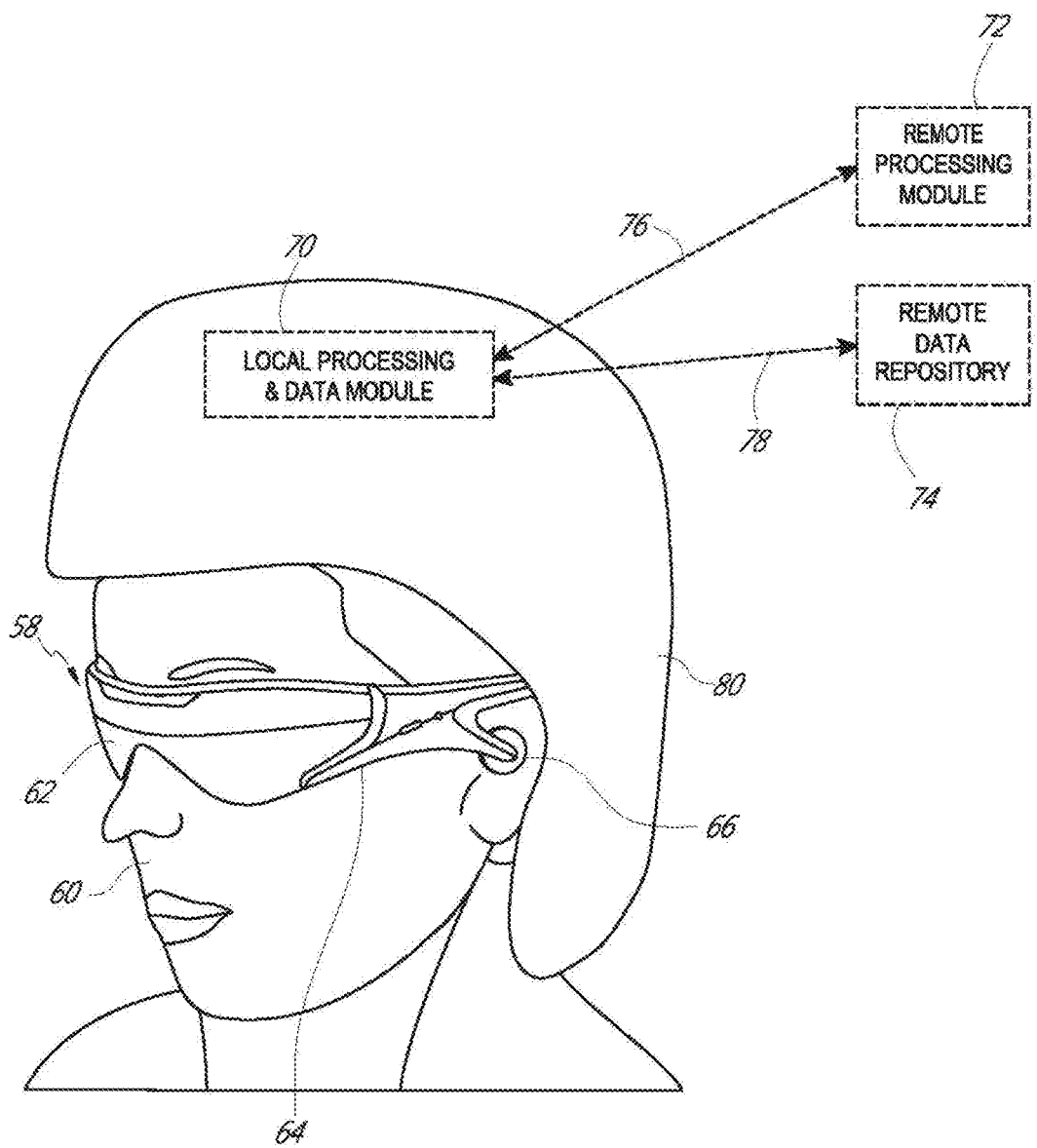
Figure 2C:
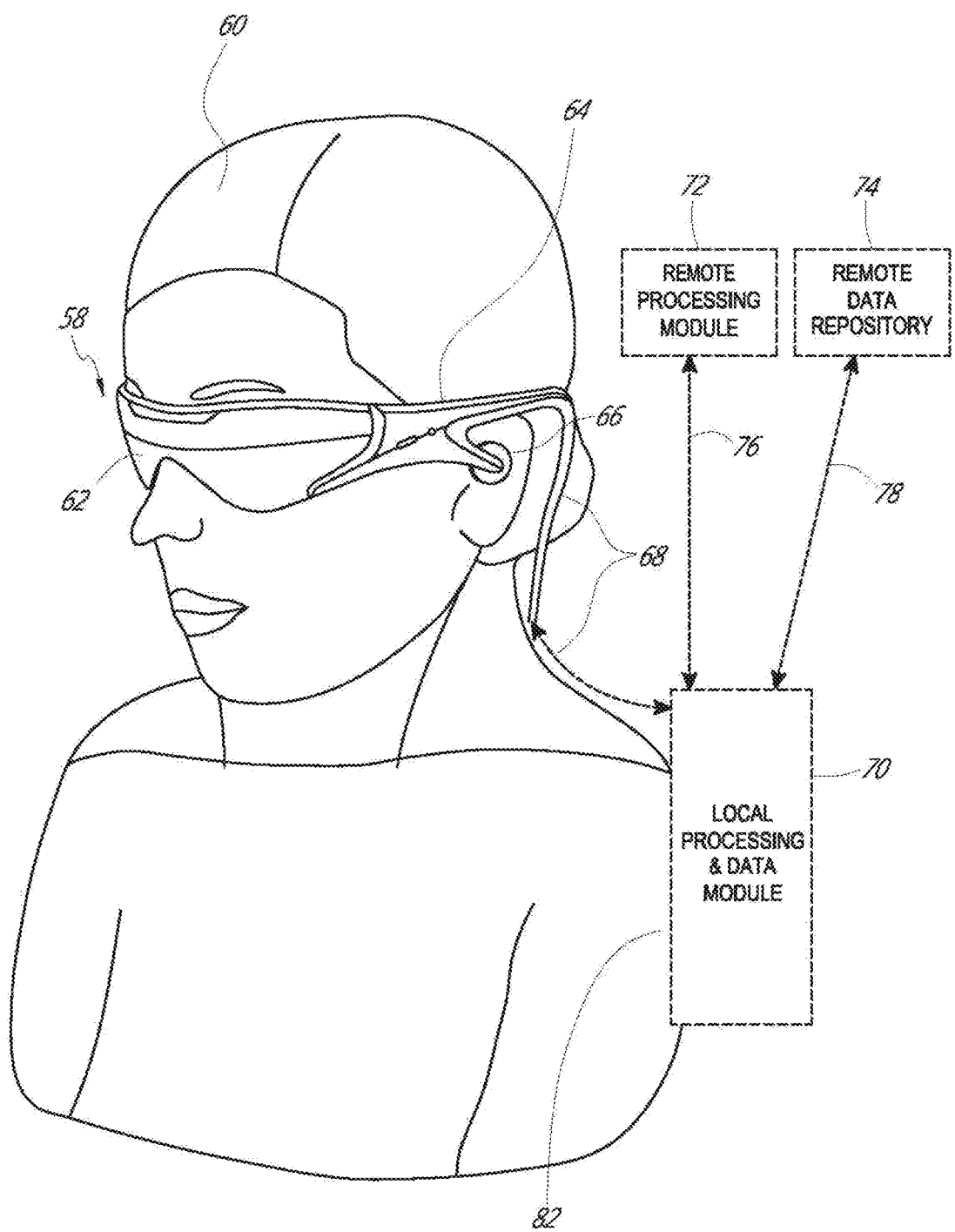
Figure 2D:
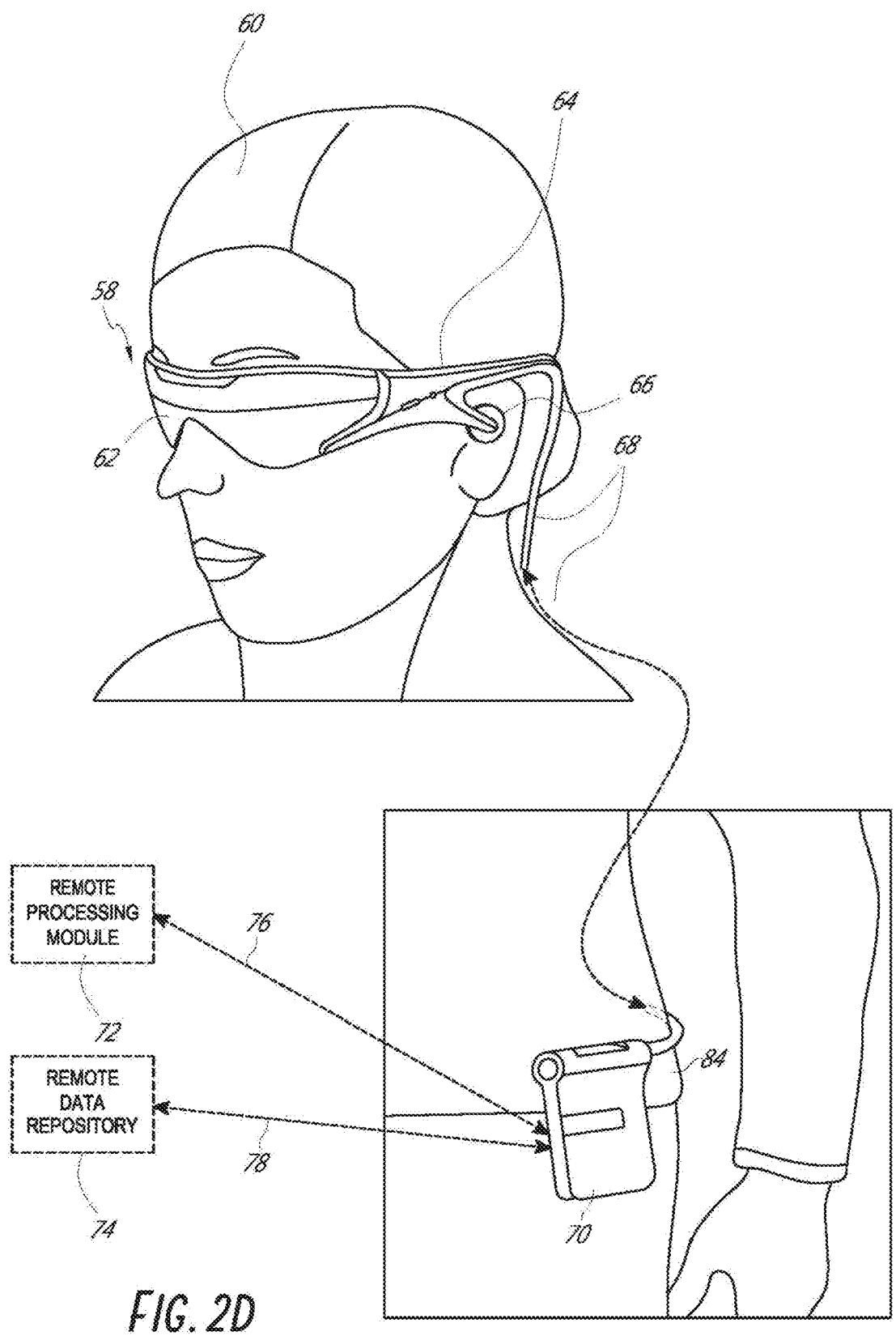

As shown in FIG. 2A, an AR system user (60) is depicted wearing head mounted component (58) featuring a frame (64) structure coupled to a display system (62) positioned in front of the eyes of the user. A speaker (66) is coupled to the frame (64) in the depicted configuration and positioned adjacent the ear canal of the user (in one embodiment, another speaker, not shown, is positioned adjacent the other ear canal of the user to provide for stereo/shapeable sound control). The display (62) is operatively coupled (68), such as by a wired lead or wireless connectivity, to a local processing and data module (70) which may be mounted in a variety of configurations, such as fixedly attached to the frame (64), fixedly attached to a helmet or hat (80) as shown in the embodiment of FIG. 2B, embedded in headphones, removably attached to the torso (82) of the user (60) in a backpack-style configuration as shown in the embodiment of FIG. 2C, or removably attached to the hip (84) of the user (60) in a belt-coupling style configuration as shown in the embodiment of FIG. 2D.

The local processing and data module (70) may comprise a power-efficient processor or controller, as well as digital memory, such as flash memory, both of which may be utilized to assist in the processing, caching, and storage of data a) captured from sensors which may be operatively coupled to the frame (64), such as image capture devices (such as cameras), microphones, inertial measurement units, accelerometers, compasses, GPS units, radio devices, and/or gyros; and/or b) acquired and/or processed using the remote processing module (72) and/or remote data repository (74), possibly for passage to the display (62) after such processing or retrieval. The local processing and data module (70) may be operatively coupled (76, 78), such as via a wired or wireless communication links, to the remote processing module (72) and remote data repository (74) such that these remote modules (72, 74) are operatively coupled to each other and available as resources to the local processing and data module (70).

In one embodiment, the remote processing module (72) may comprise one or more relatively powerful processors or controllers configured to analyze and process data and/or image information. In one embodiment, the remote data repository (74) may comprise a relatively large-scale digital data storage facility, which may be available through the internet or other networking configuration in a "cloud" resource configuration. In one embodiment, all data is stored and all computation is performed in the local processing and data module, allowing fully autonomous use from any remote modules.

Figure 3:
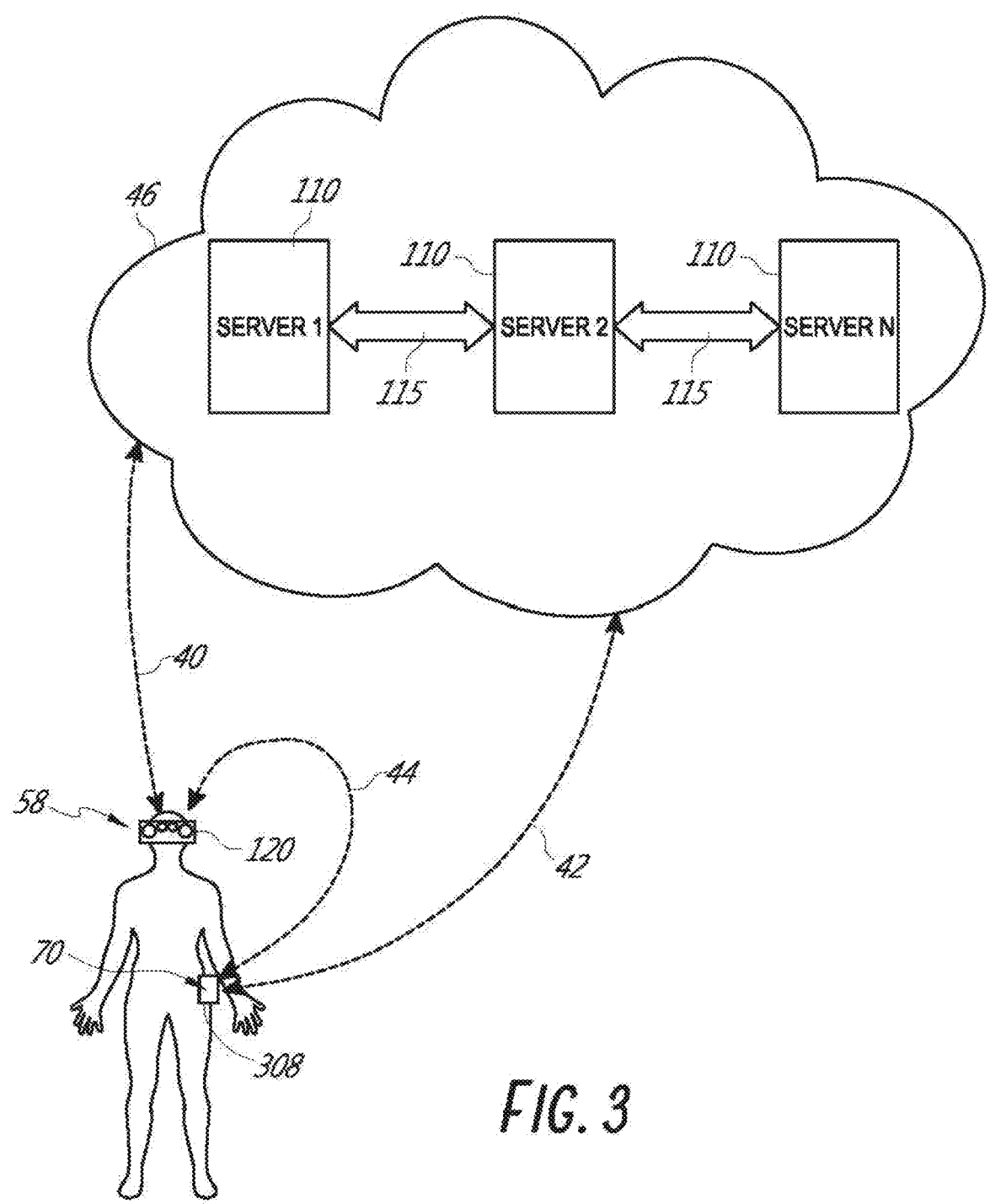
FIG. 3 schematically illustrates coordination between cloud computing assets and local processing assets.

With reference now to FIG. 3, a schematic illustrates coordination between the cloud computing assets (46) and local processing assets, which may, for example reside in head mounted componentry (58) coupled to the user's head (120) and a local processing and data module (70), coupled to the user's belt (308; therefore the component 70 may also be termed a "belt pack" 70), as shown in FIG. 3. In one embodiment, the cloud (46) assets, such as one or more server systems (110) are operatively coupled (115), such as via wired or wireless networking (wireless being preferred for mobility, wired being preferred for certain high-bandwidth or high-data-volume transfers that may be desired), directly to (40, 42) one or both of the local computing assets, such as processor and memory configurations, coupled to the user's head (120) and belt (308) as described above. These computing assets local to the user may be operatively coupled to each other as well, via wired and/or wireless connectivity configurations (44), such as the wired coupling (68) discussed below in reference to FIG. 8. In one embodiment, to maintain a low-inertia and small-size subsystem mounted to the user's head (120), primary transfer between the user and the cloud (46) may be via the link between the subsystem mounted at the belt (308) and the cloud, with the head mounted (120) subsystem primarily data-tethered to the belt-based (308) subsystem using wireless connectivity, such as ultra-wideband ("UWB") connectivity, as is currently employed, for example, in personal computing peripheral connectivity applications.

With efficient local and remote processing coordination, and an appropriate display device for a user, such as the user interface or user display system (62) shown in FIG. 2A, or variations thereof, aspects of one world pertinent to a user's current actual or virtual location may be transferred or "passed" to the user and updated in an efficient fashion. In other words, a map of the world may be continually updated at a storage location which may partially reside on the user's AR system and partially reside in the cloud resources. The map (also referred to as a "passable world model") may be a large database comprising raster imagery, 3-D and 2-D points, parametric information and other information about the real world. As more and more AR users continually capture information about their real environment (e.g., through cameras, sensors, IMUs, etc.), the map becomes more and more accurate and complete.

With a configuration as described above, wherein there is one world model that can reside on cloud computing resources and be distributed from there, such world can be "passable" to one or more users in a relatively low bandwidth form preferable to trying to pass around real-time video data or the like. The augmented experience of the person standing near the statue (e.g., as shown in FIG. 1) may be informed by the cloud-based world model, a subset of which may be passed down to them and their local display device to complete the view. A person sitting at a remote display device, which may be as simple as a personal computer sitting on a desk, can efficiently download that same section of information from the cloud and have it rendered on their display. Indeed, one person actually present in the park near the statue may take a remotely-located friend for a walk in that park, with the friend joining through virtual and augmented reality. The system will need to know where the street is, wherein the trees are, where the statue is—but with that information on the cloud, the joining friend can download from the cloud aspects of the scenario, and then start walking along as an augmented reality local relative to the person who is actually in the park.

Three-dimensional (3-D) points may be captured from the environment, and the pose (e.g., vector and/or origin position information relative to the world) of the cameras that capture those images or points may be determined, so that these points or images may be "tagged", or associated, with this pose information. Then points captured by a second camera may be utilized to determine the pose of the second camera. In other words, one can orient and/or localize a second camera based upon comparisons with tagged images from a first camera. Then this knowledge may be utilized to extract textures, make maps, and create a virtual copy of the real world (because then there are two cameras around that are registered).

So at the base level, in one embodiment a person-worn system can be utilized to capture both 3-D points and the 2-D images that produced the points, and these points and images may be sent out to a cloud storage and processing resource. They may also be cached locally with embedded pose information (e.g., cache the tagged images); so the cloud may have on the ready (e.g., in available cache) tagged 2-D images (e.g., tagged with a 3-D pose), along with 3-D points. If a user is observing something dynamic, he may also send additional information up to the cloud pertinent to the motion (for example, if looking at another person's face, the user can take a texture map of the face and push that up at an optimized frequency even though the surrounding world is otherwise basically static). More information on object recognizers and the passable world model may be found in U.S. Patent Pub. No. 2014/0306866, entitled "System and method for augmented and virtual reality", which is incorporated by reference in its entirety herein, along with the following additional disclosures, which related to augmented and virtual reality systems such as those developed by Magic Leap, Inc. of Plantation, Fla.: U.S. Patent Pub. No. 2015/0178939; U.S. Patent Pub. No. 2015/0205126; U.S. Patent Pub. No. 2014/0267420; U.S. Patent Pub. No. 2015/0302652; U.S. Patent Pub. No. 2013/0117377; and U.S. Patent Pub. No. 2013/0128230, each of which is hereby incorporated by reference herein in its entirety.

GPS and other localization information may be utilized as inputs to such processing. Highly accurate localization of the user's head, totems, hand gestures, haptic devices etc. may be advantageous in order to display appropriate virtual content to the user.

The head-mounted device (58) may include displays positionable in front of the eyes of the wearer of the device. The displays may comprise light field displays. The displays may be configured to present images to the wearer at a plurality of depth planes. The displays may comprise planar waveguides with diffraction elements. Examples of displays, head-mounted devices, and other AR components usable with any of the embodiments disclosed herein are described in U.S. Patent Publication No. 2015/0016777. U.S. Patent Publication No. 2015/0016777 is hereby incorporated by reference herein in its entirety.

Figure 4:
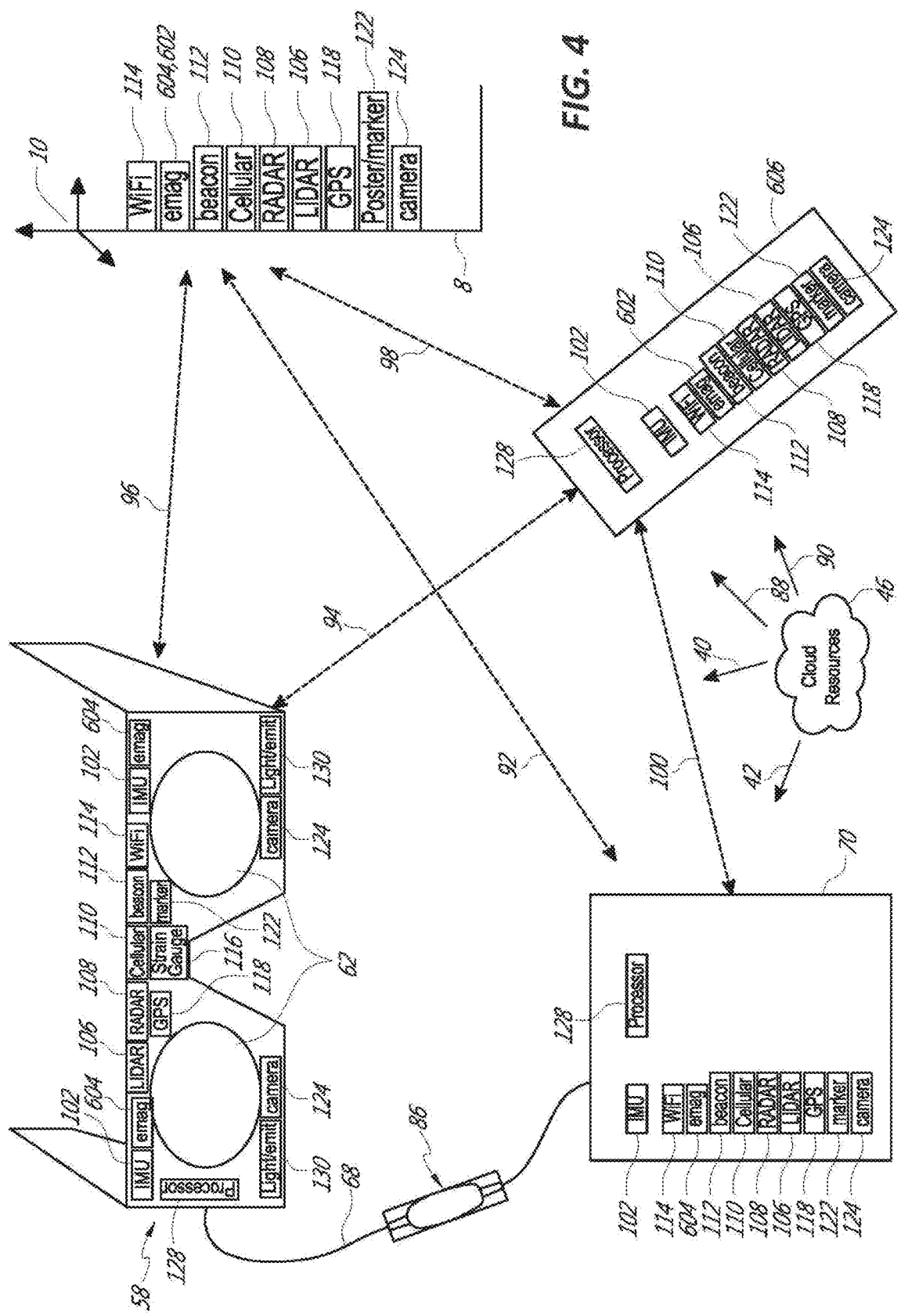
FIG. 4 schematically illustrates examples of components of an embodiment of an AR system.

With reference to FIG. 4, a system configuration is illustrated which features many sensing components. A head mounted wearable component (58) is shown operatively coupled (68) to a local processing and data module (70), such as a belt pack, here using a physical multicore lead which also features a control and quick release module (86). The local processing and data module (70) is operatively coupled (100) to a hand held component (606), here by a wireless connection such as low power Bluetooth; the hand held component (606) may also be operatively coupled (94) directly to the head mounted wearable component (58), such as by a wireless connection such as low power Bluetooth. Generally where IMU data is passed to coordinate pose detection of various components, a high-frequency connection is desirable, such as in the range of hundreds or thousands of cycles/second or higher; tens of cycles per second may be adequate for electromagnetic localization sensing, such as by the sensor (604) and transmitter (602) pairings. Also shown is a global coordinate system (10), representative of fixed objects in the real world around the user, such as a wall (8).

Cloud resources (46) also may be operatively coupled (42, 40, 88, 90) to the local processing and data module (70), to the head mounted wearable component (58), to resources which may be coupled to the wall (8) or other item fixed relative to the global coordinate system (10), respectively. The resources coupled to the wall (8) or having known positions and/or orientations relative to the global coordinate system (10) may include a wireless transceiver (114), an electromagnetic emitter (602) and/or receiver (604), a beacon or reflector (112) configured to emit or reflect a given type of radiation, such as an infrared LED beacon, a cellular network transceiver (110), a RADAR emitter or detector (108), a LIDAR emitter or detector (106), a GPS transceiver (118), a poster or marker having a known detectable pattern (122), and a camera (124).

The head mounted wearable component (58) features similar components, as illustrated, in addition to lighting emitters (130) configured to assist the camera (124) detectors, such as infrared emitters (130) for an infrared camera (124); also featured on the head mounted wearable component (58) are one or more strain gauges (116), which may be fixedly coupled to the frame or mechanical platform of the head mounted wearable component (58) and configured to determine deflection of such platform in between components such as electromagnetic receiver sensors (604) or display elements (62), wherein it may be valuable to understand if bending of the platform has occurred, such as at a thinned portion of the platform, such as the portion above the nose on the eyeglasses-like platform depicted in FIG. 4.

The head mounted wearable component (58) also features a processor (128) and one or more IMUs (102). Each of the components preferably are operatively coupled to the processor (128). The hand held component (606) and local processing and data module (70) are illustrated featuring similar components. As shown in FIG. 4, with so many sensing and connectivity means, such a system is likely to be heavy, power hungry, large, and relatively expensive. However, for illustrative purposes, such a system may be utilized to provide a very high level of connectivity, system component integration, and position/orientation tracking. For example, with such a configuration, the various main mobile components (58, 70, 606) may be localized in terms of position relative to the global coordinate system using WiFi, GPS, or Cellular signal triangulation; beacons, electromagnetic tracking (as described herein), RADAR, and LIDAR systems may provide yet further location and/or orientation information and feedback. Markers and cameras also may be utilized to provide further information regarding relative and absolute position and orientation. For example, the various camera components (124), such as those shown coupled to the head mounted wearable component (58), may be utilized to capture data which may be utilized in simultaneous localization and mapping protocols, or "SLAM", to determine where the component (58) is and how it is oriented relative to other components.

Other features and embodiments of the head mounted wearable component (58) and its sensors are described in U.S. patent application Ser. No. 15/683,664, filed Aug. 22, 2017, and entitled "AUGMENTED REALITY DISPLAY DEVICE WITH DEEP LEARNING SENSORS," the entire contents of which are hereby incorporated by reference herein.

As discussed herein, the head mounted wearable AR/VR system (58) can include a variety of sensors for determining the location and/or orientation of the system within a three-dimensional space. For example, magnetic sensors and optical sensors can be used for this purpose. Suitable magnetic sensors may include magnetometers, such as the electromagnetic sensors (604) discussed above which can be used to help determine the location and/or orientation of the AR/VR system (58) based on detection of magnetic fields from an emitter (602). Another suitable magnetic sensor is a built-in magnetometer within the IMU (102) which can help determine the location and/or orientation of the AR/VR system (58) based on detection of the Earth's magnetic field. Meanwhile, suitable optical sensors can include, for example, outward-facing visible light or infrared cameras which can likewise be used to help determine the location and/or orientation of both the AR/VR system (58) and other objects.

Examples of Thermal Management Systems

Figure 5A:
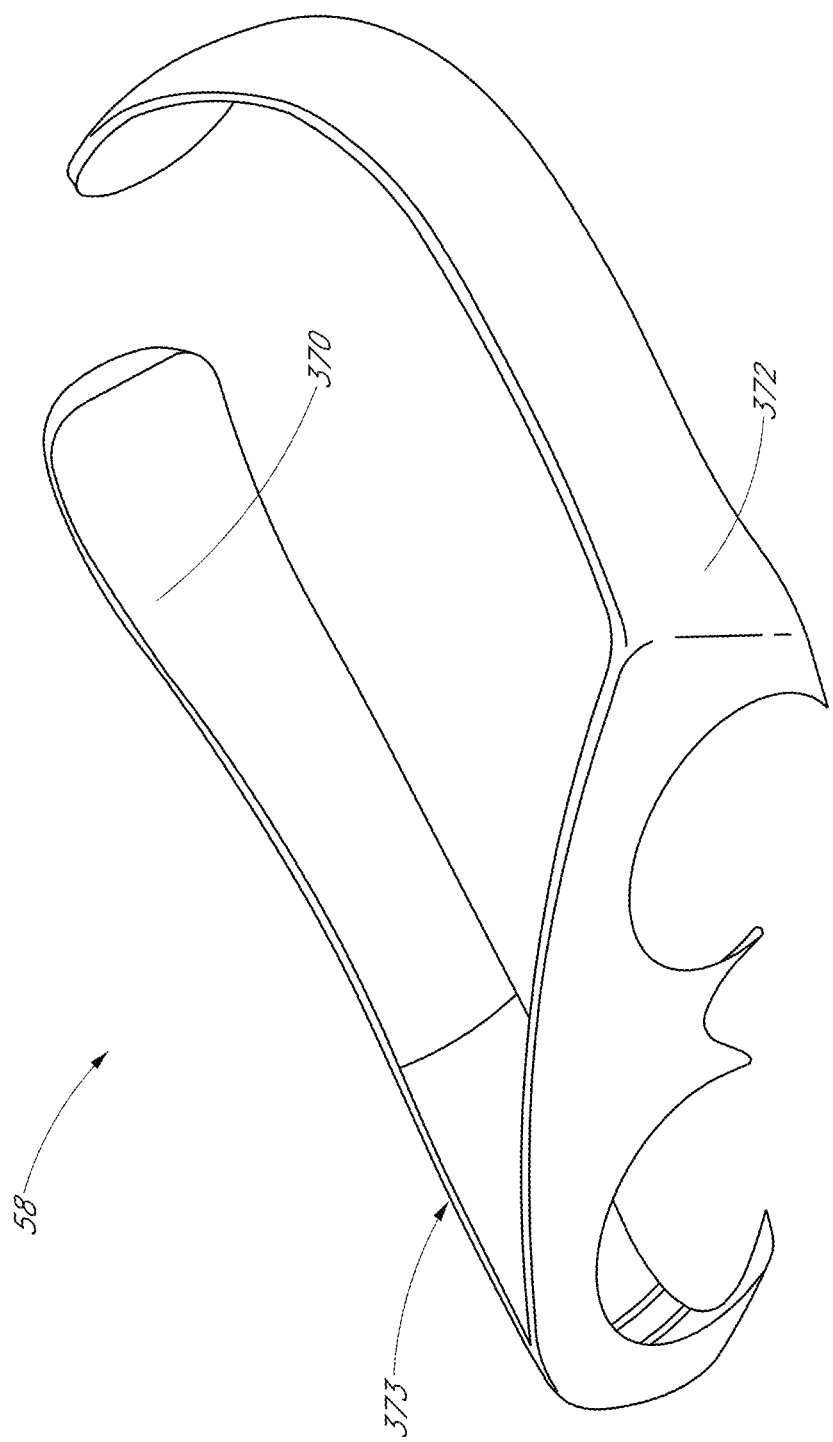
FIG. 5A is a schematic perspective view of a wearable component according to various embodiments.
Figure 5B:
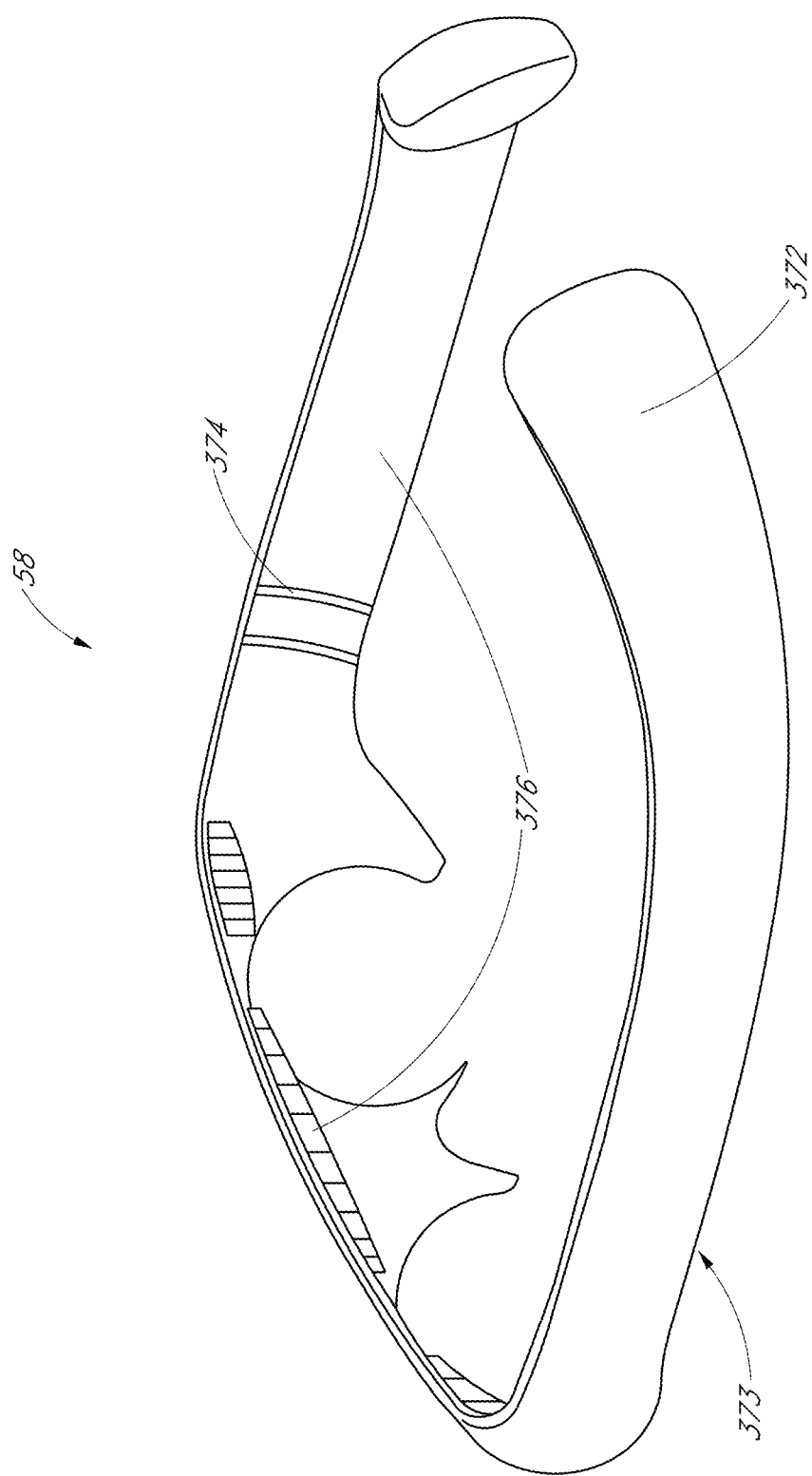
FIG. 5B is a schematic perspective view of a wearable component according to various embodiments.

Various embodiments disclosed herein relate to thermal management systems for wearable components, including, e.g., for wearable, head-mounted AR systems and devices. Referring to FIGS. 5A-6C, one of the challenges with a head mounted wearable component (58) that comprises various electronic components, such as an embedded processor, is conducting heat out of the component (58) and associated subcomponents, and away from the user's head. As shown in FIGS. 5A-5B, for example, the wearable component (58) can comprise a wearable support 373 comprising one or more support structures configured to provide mechanical support for the system subcomponents (e.g., subcomponents such as those shown in FIG. 4 configured to provide AR, VR, and other functionality), the wearable component 58 being configured to conduct thermal energy or heat away from the user's head. For example, as explained herein, the wearable component (58) can comprise one or more electronic components coupled to or disposed within the wearable support (373), including the electronic components shown and described in connection with FIG. 4. Such electronic components may generate heat, and it can be desirable to conduct the generated heat away from the user's head.

It is also desirable to have a head mounted wearable component (58) which generally is low in mass for comfort and other ergonomic and operational advantages (for example, low inertia and moment of inertia to easily stay with the head of the user during head movement). In one embodiment, various components of the head mounted wearable component (58) may comprise composite materials, such as a reinforcement material, e.g., carbon fiber strands and/or fabric combined with one or more matrix materials such as epoxy. Such a construct may be engineered to have specific structural moduli over various portions of the head mounted wearable component (58), and may be relatively low in mass. Referring to FIG. 5A, in one embodiment, the wearable support (373) can comprise a mechanical inner structure (370) that serves in limiting deflection in select areas, and to provide a thermal pathway for transferring heat away from the user's head. The wearable support (373) can also include an outer shell component (372) that may comprise a plurality of layers of composite material, such as that comprising fabric bound to epoxy or resin. Referring to FIG. 5B, one or more mechanical inner structures (376) may be provided to serve as deflection limiters in select areas where relative stiffness is desired; as with the mechanical inner structure (370) shown in FIG. 5A, the mechanical inner structure (376) of FIG. 5B may also provide a thermal pathway for transferring heat away from the user's head. As shown in FIG. 5B, strategic cuts or gaps (374) (e.g., grooves) may be formed in various layers of the wearable support (373) to serve in limiting deflection to certain areas or zones (such as in the case of what is known as a "living hinge" configuration across a portion of the construct), and to provide mechanical means for transferring heat away. In FIG. 5B, for example, the cuts or gaps (374) may be formed partially through a thickness of the wearable support (373), e.g., partially through a thickness of the inner structure of the support (373). In various embodiments, the cuts or gaps (374) can increase the amount of deflection in the proximity of the gaps (374) so as to focus deflection to the region at or near the gaps (374), thereby limiting deflection in regions of the support (373) away from the gaps (374). In various embodiments, the gaps (374) can enable the support (373) to bend inwardly so as to fold the support (373) when not in use.

One of the challenges with certain composite materials is that while some of the constituent materials, typically the reinforcement materials such as fibers or fabric, may have relatively high thermal conductivity properties, matrix materials such as epoxy typically have low thermal conductivity properties, making an overall composite have a somewhat low thermal conductivity. The thermal conductivity for the composite material may be anisotropic such that thermal conductivity in a plane parallel to the plane of reinforcement fibers may be greater than thermal conductivity in a direction normal to the plane of reinforcement fibers.

Figure 6A:
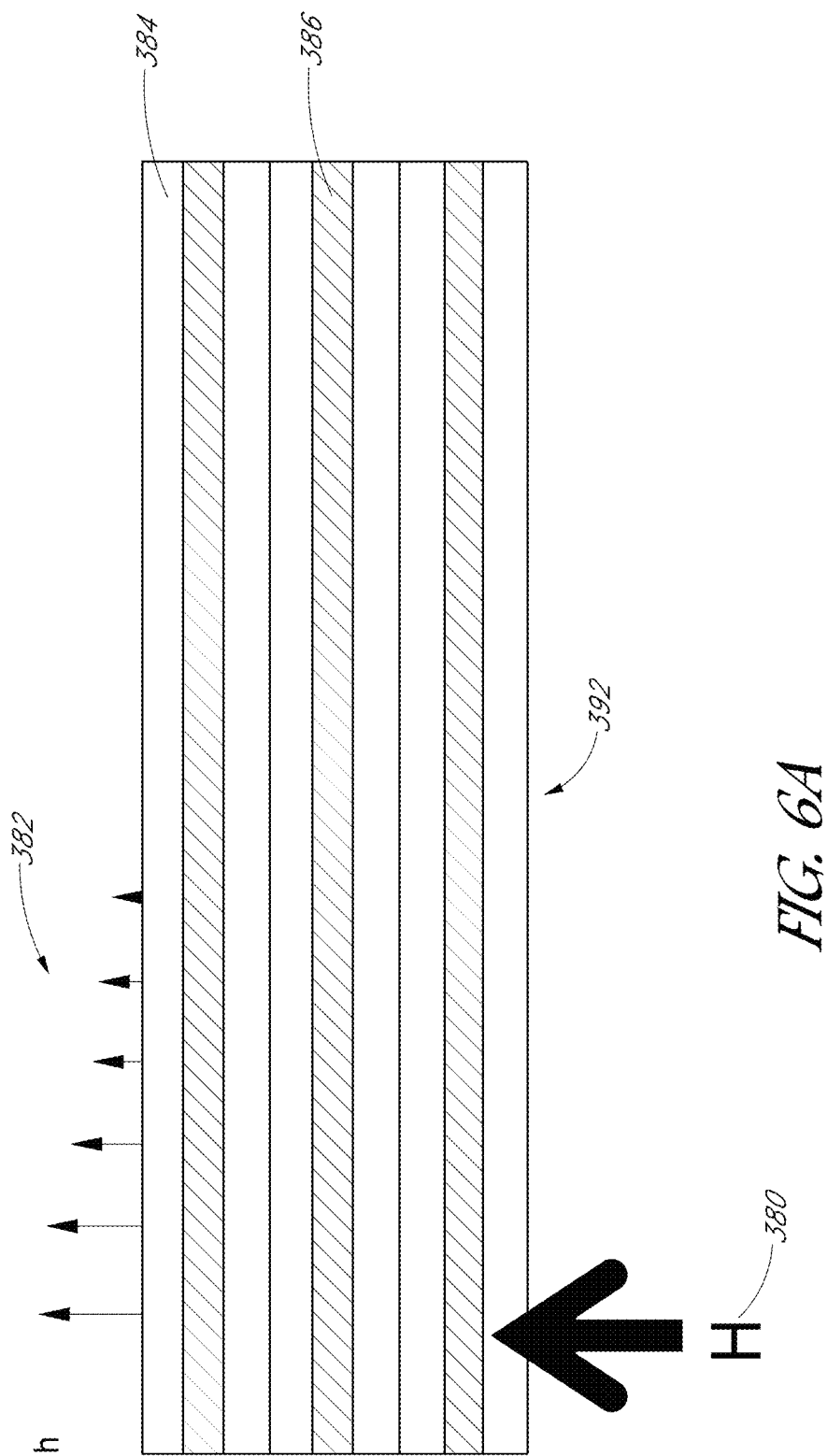
FIG. 6A is a schematic side sectional view of a composite laminate structure that transfers heat asymmetrically relative to a heat source.

Referring to FIG. 6A, with a conventional layered configuration of a composite member, layers of matrix (384) are combined with layers of fiber or fabric (386), and while the fiber or fabric (386) may have relatively high thermal conductivity, the matrix (384) typically has low thermal conductivity, thus preventing efficient escape or transfer of heat (380) due to the repeated and symmetric layering. A simplified heat profile map (382) across the composite construct from the source of heat (380) is shown in FIG. 6A, with more heat being transferred closer to the source.

Figure 6B:
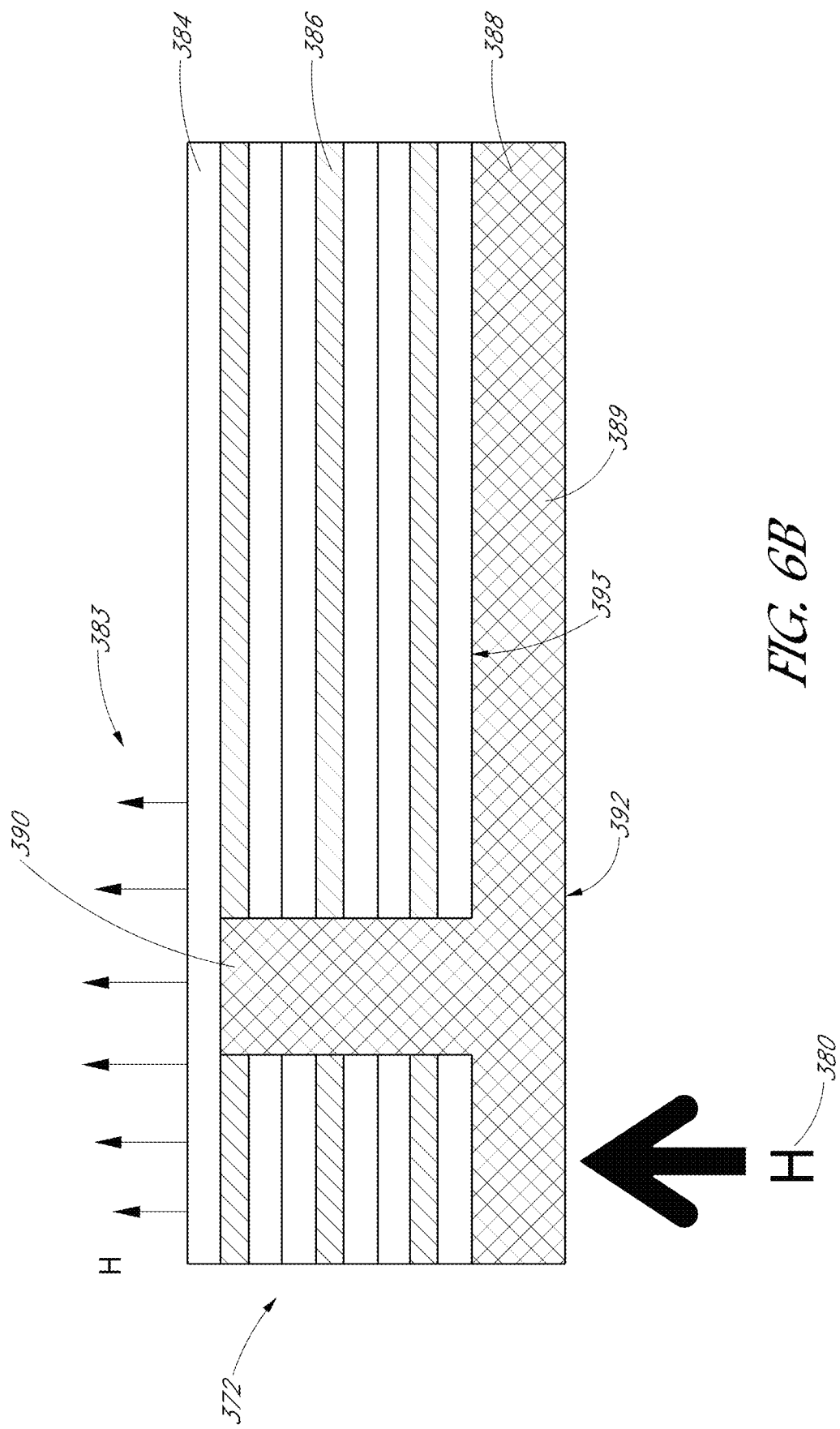
FIG. 6B is a schematic side sectional view of a thermal management structure, according to various embodiments.
Figure 6C:
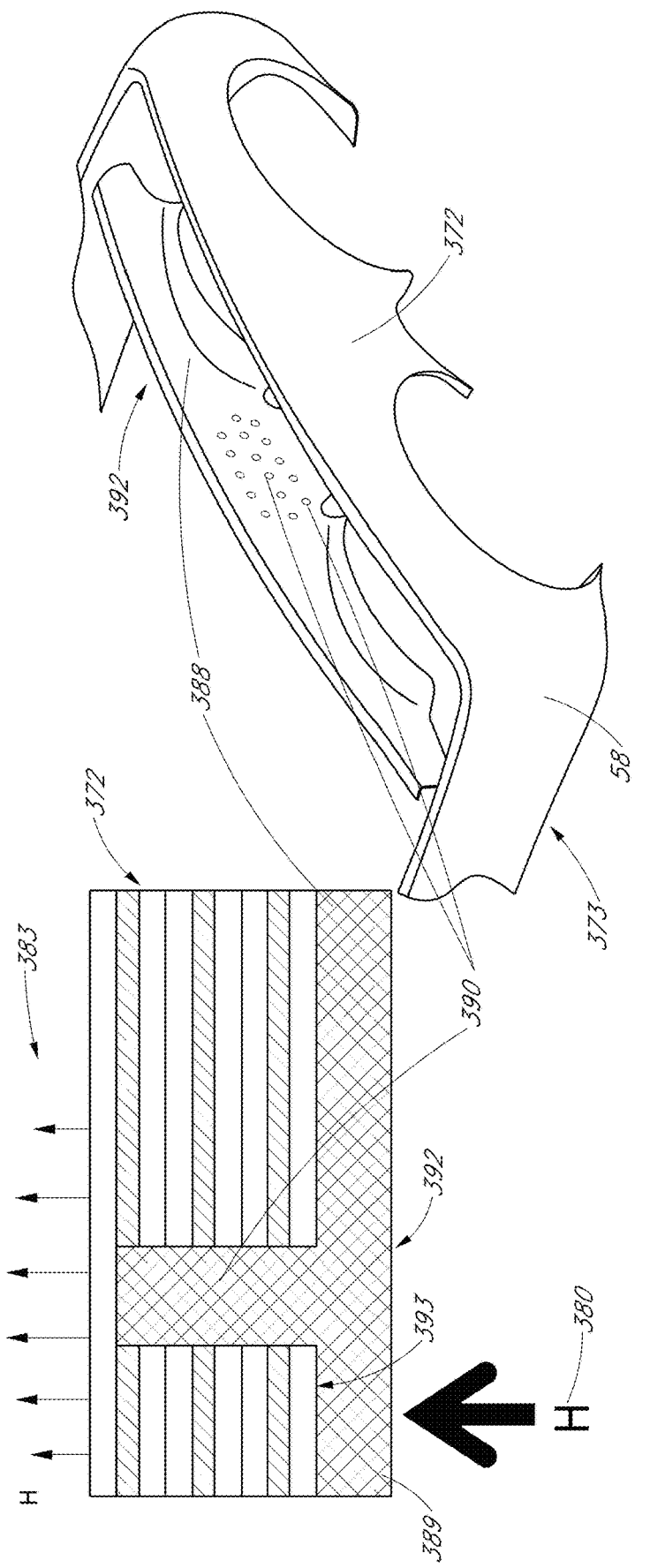
FIG. 6C is a schematic view of a wearable component comprising the thermal management structure of FIG. 6B.

Accordingly, various embodiments disclosed herein include a thermal management structure or system that can be in thermal communication with the various electronic component(s) of the wearable component (58). The thermal management structure can be configured to transfer heat from the electronic component(s) away from the head of the user, thus away from a user side (392) of the wearable support (373), when the wearable support (373) is disposed on the user's head. Referring to FIGS. 6B and 6C, asymmetries of various types may be provided in composite constructs of an outer shell structure (372) (which may comprise a laminate structure) to more optimally transfer heat across the construct, and at specified geometric positions. In FIGS. 6A-6C, for example, the outer shell structure (372) can comprise a laminate structure with a plurality of alternating first and second layers, with the first layer (e.g., layer (386)) having a higher thermal conductivity than the second layer (e.g., matrix layer (384)). In some arrangements, such as those shown in FIGS. 6B-6C, adjacent layers (386) can be separated by one or a plurality (e.g., two) of layers (384).

Referring to FIG. 6B, an internal mechanical structure (388) having a relatively high thermal conductivity is shown extending across a substantial portion of the composite construct (e.g., the outer shell structure (372)) parallel to the adjoining face of the composite construct. Additionally, a thermal management structure, including "thermal via" (390), is shown positioned near the heat source (380) to specifically focus heat transfer from the source (380) across at least one layer of the composite structure at such location. This is illustrated by, for example, the sample heat profile plot (383) with larger arrows generally representing more heat transferred than smaller arrows. In some embodiments, the thermal management structure directs heat from heat source (380) away from a user side (392) of the support structure, e.g., away from a side of the wearable component (58) that is adjacent or that faces the user when worn on the head of the user. In some embodiments, the internal mechanical structure (388) can be thermally coupled to the heat source (380), e.g., portions of the structure (388), such as the member (389) described below, may contact portions of the source (380) (such as an electronic component) so as to thermally conduct heat away from the source (380). It should be appreciated that the internal mechanical structure (388) shown in FIGS. 6B-6C may also include the mechanical structures shown in FIGS. 5A-5B, including, e.g., the gaps or grooves (374), etc.

As shown in FIG. 6B, for example, the internal mechanical structure (388) can comprise a thermally conductive planar member (389) coupled (e.g., adhered or otherwise mechanically connected) to a back surface (393) of the shell structure (372). The thermally conductive via (390) can extend from (e.g., can be coupled to or formed with) the thermally conductive planar member (389). As shown, the via (390) can be disposed non-parallel (e.g., generally perpendicular to) the thermally conductive planar member (389). Further, the thermally conductive via (390) can extend at least partially through a thickness of the outer shell structure (372). In the illustrated embodiment, for example, the via (390) extends partially through the thickness of the outer shell structure (372). In other embodiments, the via (390) may extend entirely through the thickness of the outer shell structure (372). In some embodiments, a combined thickness of the outer shell (372) and the inner mechanical structure (388) can be in a range of 2 mm to 5 mm, or in a range of 2 mm to 4 mm, or in a range of 2 mm to 3 mm. In some embodiments, a length of the via (390) can be less than the overall thickness of the outer shell (372) and mechanical structure (388). For example, in some embodiments, a length of the via (390) can be less than 5 mm, less than 4 mm, less than 3 mm, or less than 2 mm. In some embodiments, a length of the via (390) can be in a range of 0.5 mm to 5 mm, in a range of 0.5 mm to 3 mm, in a range of 0.5 mm to 2 mm, in a range of 0.5 mm to 1 mm, in a range of 0.25 mm to 2 mm, in a range of 0.25 mm to 1 mm, or in a range of 1 mm to 2 mm.

In some embodiments, as shown in FIGS. 6B-6C, one or a plurality of the relatively low thermal conductivity layers (384) can be provided between the outer or distal end of the via (390) and the outside surface of the wearable component (58) or the outside surface of the shell (372), which may prevent hot spots on the outside surface of the component (58). When the wearable support (373) is worn on the head of the user, the internal mechanical structure (388) can be disposed between the head of the user and the outer shell structure (372). The support (373) can beneficially be configured to transfer heat from the electronic component(s) away from the user's head to the outer shell structure (372).

FIG. 6C is an exploded view in which an inner mechanical structure (388) is illustrated as being separate from the outer shell structure (372) for ease of illustration. In various embodiments, the inner mechanical structure (388) and vias (390) can be coupled with the outer shell (372) in any suitable manner. For example, in some embodiments, the laminate structure of the shell (372) (e.g., the alternating layers 384, 386) can be laminated, deposited, or molded about the vias (390) in some embodiments. In other embodiments, the vias (390) can be inserted or snapped into corresponding openings of the shell structure (372). Still other ways of coupling the vias (390) and inner structure (388) to the shell structure (372) may be suitable. In various embodiments, as explained herein, the shell structure (372) can comprise the laminate structure shown in FIGS. 6B and 6C, e.g., the alternating layers (384, 386). The outer shell structure (372) can comprise other mechanical support and/or thermal management structures as well, including, e.g., an outer mechanical cover or layer over the laminate structure.

FIG. 6C illustrates an implementation of such a configuration with the internal mechanical structure (388) which may be exposed to relatively high heat (380), such as from an embedded processor, camera, or other exothermic electronic component. Such heat may be directed away from such component using a thermal via (390) which may comprise a relatively high thermal conductivity material. Suitable materials for relatively high thermal conductivity fibers or fabrics (e.g., for the first layers (386)) include carbon fiber (thermal conductivity between about 21 and 180 W/mk, the units representing watts per meter kelvin); high modulus mesophase pitch carbon fiber, in the fiber direction (500 W/mk). Glass has a thermal conductivity of about 1 W/mk. Typical epoxy matrix materials (e.g., for the second layers (384)) have relatively low thermal conductivity, as noted above (between about 0.5 and 1.5 W/mk), although certain other components may be added to the epoxy matrix (e.g., the second layers (384)) to increase the thermal conductivity. For example, in various embodiments carbon nanotube material (theoretical thermal conductivity of 3,500 W/mk) may be added; and/or Graphene (theoretical thermal conductivity of 5,020 W/mk); and/or diamond (thermal conductivity of 2,500 W/mk); and/or metallic components, such as aluminum, copper, gold, or silver (210 W/mK, 398 W/mk, 315 W/mk, 428 W/mk, respectively), may be added to a matrix material (i.e., to be combined with a fiber or fabric in a composite configuration, and/or to be utilized as a thermal via structure) to improve its over thermal conductivity to assist in moving heat away from the device and away from the user's head. As shown in FIG. 6C, for example, the heat distribution (383) at the surface of the outer shell (372) transferred from the heat (380) can be more uniform than the distribution illustrated in FIG. 6A. The transfer of heat (380) may also be better controlled. For example, the heat (380) can be transferred over a smaller area (e.g., left and right of the via (390) in FIG. 6B) whereas the heat is transferred over a larger area in the absence of the via (390). The rate of heat transfer can also be faster in certain embodiments. For example, the via (390) can conduct heat quickly therethrough to each of three successive more conductive layers (386) where the heat can be received and dissipated away from the source of the heat (380). This can have the advantage of removing heat load from the electronic components which can help keep the heat of the components down such that they can operate efficiently and last longer. Further, as shown in FIG. 6C, an array of multiple vias (390) can be coupled with the structure (388) so as to further improve heat transfer away from the user.

In another embodiment, strands or leads of electrically conductive material may be layered into an overall composite structure to provide not only enhanced thermal conductivity, but also electrical conductivity, to function as a power, signal, or other lead that is built or integrated into such structure. The engineered composite structures disclosed herein may be hand-manufactured layer by layer, or may be robotically constructed. In one embodiment, a mold may be created, into which the various layers of fiber and/or fabric, and matrix material, may be placed for combination and curing. In one embodiment, a powder coating layer maybe placed first against the mold, and last against the other side of the mold, such that upon removal of the cured component, both sides of such component are powder coated. Powder coating or other coating, sealing, or painting materials may be specifically selected for relatively high thermal conductivity, to facilitate in the exiting of heat away from such componentry.

As described above in FIG. 4, various components may be coupled to a head mounted wearable component (58). In various embodiments, such components may be physically integrated within the layers of a composite such that they are embedded within such components.

For example, in one embodiment, it may be desirable to have one or more copper loop magnetic flux capturing circuits embedded at specific positions adjacent an outer surface for electromagnetic tracking. In another embodiment, it may be desirable to have one or more conductive leads functioning as a radiofrequency antenna, and it may be desirable for specific absorption rate ("SAW") reasons to position such antenna, whether it is a transmitter or receiver, on the opposite side of such component relative to the user's skin. In another embodiment, the fiber and/or fabric positioning may be specifically engineered to provide annular structural enhancement around locations of apertures to be created within a construct, such as for a camera lens or other device.

In one embodiment, the various thermal components may be specifically engineered to not only move heat away from certain components and away from the user, but also to eliminate certain conventional components such as air vents, fans, and the like. Thus, in various embodiments, the wearable component (58) may not include any fans and/or may not include any air vents. For example, structures can be provided where all or a majority of heat is transferred through a solid structure rather than through channels or apertures. An assembly can be provided where all or a majority of heat is transferred by conduction and no heat is transferred through the structure by convection. An assembly can be provided where all or a majority of heat is transferred by conduction through the structure and by convection at external surfaces but no heat is transferred by heat advection.

Additional Aspects

In a 1st aspect, a wearable component configured to be worn on a head of a user is disclosed. The wearable component can comprise a wearable support and an electronic component in thermal communication with the wearable support. A thermal management structure can be in thermal communication with the electronic component, the thermal management structure configured to transfer heat from the electronic component away from a user side of the wearable component.

In a 2nd aspect, the wearable component of aspect 1, wherein the thermal management structure comprises a mechanical structure disposed in or on the wearable support and in thermal communication with the electronic component.

In a 3rd aspect, the wearable component of aspect 2, further comprising one or more grooves formed through at least a portion of a thickness of the mechanical structure, the one or more grooves configured to control deflection of the mechanical structure.

In a 4th aspect, the wearable component of any one of aspects 2 to 3, wherein the thermal management structure comprises an outer shell coupled with the mechanical structure such that the mechanical structure is between the user side of the wearable component and the outer shell structure, and wherein the mechanical structure is configured to transfer heat from the electronic component to the outer shell.

In a 5th aspect, the wearable component of aspect 4, further comprising a thermally conductive via extending from the mechanical structure at least partially through a thickness of the outer shell.

In a 6th aspect, the wearable component of aspect 5, wherein the mechanical structure comprises a thermally conductive planar member coupled to a back surface of the outer shell.

In a 7th aspect, the wearable component of aspect 6, wherein the thermally conductive via is coupled to or formed with the thermally conductive planar member, the thermally conductive via disposed non-parallel relative to the thermally conductive planar member.

In a 8th aspect, the wearable component of any one of aspects 4 to 7, wherein the outer shell comprises a laminate structure.

In a 9th aspect, the wearable component of aspect 8, wherein the laminate structure comprises a plurality of alternating first and second layers, the first layer having a higher thermal conductivity than the second layer.

In a 10th aspect, the wearable component of aspect 9, wherein the first layer comprises a reinforcement material.

In a 11th aspect, the wearable component of aspect 10, wherein the reinforcement material comprises a fiber or fabric.

In a 12th aspect, the wearable component of aspect 11, wherein the first layer comprises carbon fiber.

In a 13th aspect, the wearable component of any one of aspects 9 to 12, wherein the second layer comprises an epoxy.

In a 14th aspect, the wearable component of aspect 13, further comprising one or more thermally conductive components within the epoxy.

In a 15th aspect, the wearable component of aspect 14, wherein the one or more thermally conductive components comprises at least one of carbon nanotubes, graphene, or a metal.

In a 16th aspect, the wearable component of any one of aspects 1 to 15, wherein the electronic component comprises at least one of a processor and a camera.

In a 17th aspect, the wearable component of any one of aspects 1 to 16, wherein the wearable component comprises an augmented reality device.

In a 18th aspect, the wearable component of any one of aspects 1 to 17, further comprising one or more electrical components embedded in the thermal management system.

In a 19th aspect, the wearable component of any one of aspects 1 to 18, wherein the thermal management system does not include any fans.

In a 20th aspect, the wearable component of any one of aspects 1 to 19, wherein the thermal management system does not include any air vents.

In a 21st aspect, a wearable component configured to be worn on a head of a user is disclosed. The wearable component can comprise an internal mechanical structure and an outer shell structure mechanically coupled with the internal mechanical structure such that the internal mechanical structure is between a user side of the wearable component and the outer shell structure. The internal mechanical structure can be configured to transfer heat away from the user side of the wearable component to the outer shell structure. A thermally conductive via can extend from the internal mechanical structure at least partially through a thickness of the outer shell structure.

In a 22nd aspect, the wearable component of aspect 21, wherein the internal mechanical structure comprises a thermally conductive planar member coupled to a back surface of the outer shell structure.

In a 23rd aspect, the wearable component of aspect 22, wherein the thermally conductive via is coupled to or formed with the thermally conductive planar member, the thermally conductive via disposed non-parallel relative to the thermally conductive planar member.

In a 24th aspect, the wearable component of any one of aspects 21 to 23, wherein the outer shell structure comprises a laminate structure, the thermally conductive via extending through a plurality of layers of the laminate structure.

In a 25th aspect, the wearable component of aspect 24, wherein the laminate structure comprises a plurality of alternating first and second layers, the first layer having a higher thermal conductivity than the second layer.

In a 26th aspect, the wearable component of any one of aspects 21 to 25, further comprising an electronic component coupled with the wearable component, wherein the internal mechanical structure is configured to transfer heat from the electronic component to the outer shell structure.

In a 27th aspect, the wearable component of any one of aspects 25 to 26, wherein heat is conducted through the thermally conductive via and through the plurality of alternating first and second layers to conduct heat away from the head of the user when the wearable component is worn on the head of the user.

In a 28th aspect, a method of manufacturing a wearable component configured to be worn on a head of a user is disclosed. The method can comprise providing an internal mechanical structure and a thermally conductive via extending from the internal mechanical structure at least partially through a thickness of the outer shell structure. The method can comprise mechanically coupling a back surface of an outer shell structure to the internal mechanical structure such that the internal mechanical structure is between a user side of the wearable component and the outer shell structure. The internal mechanical structure can be configured to transfer heat away from the user side of the wearable component to the outer shell structure.

In a 29th aspect, the method of aspect 28, further comprising providing an electronic component to be in thermal communication with the internal mechanical structure.

In a 30th aspect, the method of aspect 28 or 29, further comprising forming one or more grooves through at least a portion of a thickness of the internal mechanical structure, the one or more grooves configured to control deflection of the internal mechanical structure.

Additional Considerations

Each of the processes, methods, and algorithms described herein and/or depicted in the attached figures may be embodied in, and fully or partially automated by, code modules executed by one or more physical computing systems, hardware computer processors, application-specific circuitry, and/or electronic hardware configured to execute specific and particular computer instructions. For example, computing systems can include general purpose computers (e.g., servers) programmed with specific computer instructions or special purpose computers, special purpose circuitry, and so forth. A code module may be compiled and linked into an executable program, installed in a dynamic link library, or may be written in an interpreted programming language. In some implementations, particular operations and methods may be performed by circuitry that is specific to a given function.

Further, certain implementations of the functionality of the present disclosure are sufficiently mathematically, computationally, or technically complex that application-specific hardware or one or more physical computing devices (utilizing appropriate specialized executable instructions) may be necessary to perform the functionality, for example, due to the volume or complexity of the calculations involved or to provide results substantially in real-time. For example, a video may include many frames, with each frame having millions of pixels, and specifically programmed computer hardware is necessary to process the video data to provide a desired image processing task or application in a commercially reasonable amount of time.

Code modules or any type of data may be stored on any type of non-transitory computer-readable medium, such as physical computer storage including hard drives, solid state memory, random access memory (RAM), read only memory (ROM), optical disc, volatile or non-volatile storage, combinations of the same and/or the like. The methods and modules (or data) may also be transmitted as generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). The results of the disclosed processes or process steps may be stored, persistently or otherwise, in any type of non-transitory, tangible computer storage or may be communicated via a computer-readable transmission medium.

Any processes, blocks, states, steps, or functionalities in flow diagrams described herein and/or depicted in the attached figures should be understood as potentially representing code modules, segments, or portions of code which include one or more executable instructions for implementing specific functions (e.g., logical or arithmetical) or steps in the process. The various processes, blocks, states, steps, or functionalities can be combined, rearranged, added to, deleted from, modified, or otherwise changed from the illustrative examples provided herein. In some embodiments, additional or different computing systems or code modules may perform some or all of the functionalities described herein. The methods and processes described herein are also not limited to any particular sequence, and the blocks, steps, or states relating thereto can be performed in other sequences that are appropriate, for example, in serial, in parallel, or in some other manner. Tasks or events may be added to or removed from the disclosed example embodiments. Moreover, the separation of various system components in the implementations described herein is for illustrative purposes and should not be understood as requiring such separation in all implementations. It should be understood that the described program components, methods, and systems can generally be integrated together in a single computer product or packaged into multiple computer products. Many implementation variations are possible.

The processes, methods, and systems may be implemented in a network (or distributed) computing environment. Network environments include enterprise-wide computer networks, intranets, local area networks (LAN), wide area networks (WAN), personal area networks (PAN), cloud computing networks, crowd-sourced computing networks, the Internet, and the World Wide Web. The network may be a wired or a wireless network or any other type of communication network.

The invention includes methods that may be performed using the subject devices. The methods may comprise the act of providing such a suitable device. Such provision may be performed by the end user. In other words, the "providing" act merely requires the end user obtain, access, approach, position, set-up, activate, power-up or otherwise act to provide the requisite device in the subject method. Methods recited herein may be carried out in any order of the recited events which is logically possible, as well as in the recited order of events.

The systems and methods of the disclosure each have several innovative aspects, no single one of which is solely responsible or required for the desirable attributes disclosed herein. The various features and processes described above may be used independently of one another, or may be combined in various ways. All possible combinations and subcombinations are intended to fall within the scope of this disclosure. Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination. No single feature or group of features is necessary or indispensable to each and every embodiment.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. In addition, the articles "a," "an," and "the" as used in this application and the appended claims are to be construed to mean "one or more" or "at least one" unless specified otherwise. Except as specifically defined herein, all technical and scientific terms used herein are to be given as broad a commonly understood meaning as possible while maintaining claim validity. It is further noted that the claims may be drafted to exclude any optional element.

As used herein, a phrase referring to "at least one of" a list of items refers to any combination of those items, including single members. As an example, "at least one of: A, B, or C" is intended to cover: A, B, C, A and B, A and C, B and C, and A, B, and C. Conjunctive language such as the phrase "at least one of X, Y and Z," unless specifically stated otherwise, is otherwise understood with the context as used in general to convey that an item, term, etc. may be at least one of X, Y or Z. Thus, such conjunctive language is not generally intended to imply that certain embodiments require at least one of X, at least one of Y and at least one of Z to each be present.

Similarly, while operations may be depicted in the drawings in a particular order, it is to be recognized that such operations need not be performed in the particular order shown or in sequential order, or that all illustrated operations be performed, to achieve desirable results. Further, the drawings may schematically depict one more example processes in the form of a flowchart. However, other operations that are not depicted can be incorporated in the example methods and processes that are schematically illustrated. For example, one or more additional operations can be performed before, after, simultaneously, or between any of the illustrated operations. Additionally, the operations may be rearranged or reordered in other implementations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. A wearable component configured to be worn on a head of a user, the wearable component including a user surface configured to face the head of the user when worn by the user and an outside surface opposite the user surface and spaced from the user surface along a first direction non-parallel to the user surface, the outside surface configured to face away from the head of the user when worn by the user, the wearable component comprising:
   a wearable support having a thickness along the first direction;
   an electronic component in thermal communication with the wearable support; and
   a thermal management structure in thermal communication with the electronic component, the thermal management structure comprising a thermally conductive structure extending through at least a portion of the thickness of the wearable support and configured to transfer heat along the first direction from the electronic component away from the user surface of the wearable component towards the outside surface of the wearable component,
   wherein the thermally conductive structure comprises a thermally conductive planar member in thermal communication with the electronic component and a thermally conductive via coupled to or formed with the planar member, the thermally conductive via extending non-parallel from the planar member such that the planar member is disposed between the thermally conductive via and the electronic component, the thermal management structure comprising a plurality of layers disposed about the thermally conductive via.

2. The wearable component of claim 1, wherein the thermal management structure comprises a mechanical structure disposed in or on the wearable support and in thermal communication with the electronic component.

3. The wearable component of claim 2, further comprising one or more grooves formed through at least a portion of a thickness of the mechanical structure, the one or more grooves configured to control deflection of the mechanical structure.

4. The wearable component of claim 2, wherein the thermal management structure comprises an outer shell coupled with the mechanical structure such that the mechanical structure is between the user side of the wearable component and the outer shell structure, and wherein the mechanical structure is configured to transfer heat from the electronic component to the outer shell, the outer shell comprising the plurality of layers.

5. The wearable component of claim 4, wherein the thermally conductive via extends at least partially through a thickness of the outer shell.

6. The wearable component of claim 5, wherein the thermally conductive planar member is coupled to a back surface of the outer shell.

7. The wearable component of claim 4, wherein the outer shell comprises a laminate structure.

8. The wearable component of claim 7, wherein the laminate structure comprises a plurality of alternating first and second layers, the first layer having a higher thermal conductivity than the second layer.

9. The wearable component of claim 8, wherein the first layer comprises a reinforcement material.

10. The wearable component of claim 9, wherein the reinforcement material comprises a fiber or fabric.

11. The wearable component of claim 10, wherein the first layer comprises carbon fiber.

12. The wearable component of claim 8, wherein the second layer comprises an epoxy.

13. The wearable component of claim 12, further comprising one or more thermally conductive components within the epoxy.

14. The wearable component of claim 13, wherein the one or more thermally conductive components comprises at least one of carbon nanotubes, graphene, or a metal.

15. The wearable component of claim 1, wherein the electronic component comprises at least one of a processor and a camera.

16. The wearable component of claim 1, wherein the wearable component comprises an augmented reality device.

17. The wearable component of claim 1, further comprising one or more electrical components embedded in the thermal management system.

18. The wearable component of claim 1, wherein the thermal management system does not include any fans.

19. The wearable component of claim 1, wherein the thermal management system does not include any air vents.

20. A wearable component configured to be worn on a head of a user, the wearable component including a user surface configured to face the head of the user when worn by the user and an outside surface opposite the user surface and spaced from the user surface along a first direction non-parallel to the user surface, the outside surface configured to face away from the head of the user when worn by the user, the wearable component comprising:
a wearable support having a thickness along the first direction;
an electronic component in thermal communication with the wearable support;
a thermally conductive planar member in thermal communication with the electronic component;
an array of multiple conductive vias in thermal communication with the electronic component and configured to transfer heat from the electronic component away along the first direction from the user surface of the wearable component through at least a portion of the thickness, the multiple conductive vias coupled to or formed with the planar member, the multiple conductive vias extending non-parallel from the planar member such that the planar member is disposed between the multiple conductive vias and the electronic component; and
a plurality of layers disposed about the multiple conductive vias.

21. The wearable component of claim 20, further comprising a mechanical structure disposed in or on the wearable support and in thermal communication with the electronic component and an outer shell coupled with the mechanical structure such that the mechanical structure is between the user surface of the wearable component and the outer shell structure, and wherein the mechanical structure is configured to transfer heat from the electronic component to the outer shell, the array of multiple conductive vias extending at least partially through a thickness of the outer shell, the outer shell comprising the plurality of layers.

22. A wearable component configured to be worn on a head of a user, the wearable component including a user surface configured to face the head of the user when worn by the user and an outside surface opposite the user surface and spaced from the user surface along a first direction non-parallel to the user surface, the outside surface configured to face away from the head of the user when worn by the user, the wearable component comprising:
a wearable support having a thickness along the first direction;
an electronic component in thermal communication with the wearable support; and
a thermal management structure in thermal communication with the electronic component, the thermal management structure comprising a thermally conductive structure extending through at least a portion of the thickness of the wearable support and configured to transfer heat along the first direction from the electronic component away from the user surface of the wearable component towards the outside surface of the wearable component,
wherein the thermally conductive structure comprises a thermally conductive planar member in thermal communication with the electronic component and a thermally conductive via coupled to or formed with the planar member, the thermally conductive via extending generally perpendicular from the planar member such that the planar member is disposed between the thermally conductive via and the electronic component.

23. The wearable component of claim 22, further comprising a plurality of alternating first and second layers disposed about the thermally conductive via, the first layer having a higher thermal conductivity than the second layer.

* * * * *